March 7, 1950 N. J. OMAN 2,500,090

RADIO RELAYING

Filed Feb. 14, 1945 3 Sheets-Sheet 1

INVENTOR.
NILS J. OMAN
BY H. S. Grover
ATTORNEY

March 7, 1950 N. J. OMAN 2,500,090

RADIO RELAYING

Filed Feb. 14, 1945 3 Sheets-Sheet 2

INVENTOR.
NILS J. OMAN
BY H. S. Grover
ATTORNEY

March 7, 1950 N. J. OMAN 2,500,090

RADIO RELAYING

Filed Feb. 14, 1945 3 Sheets-Sheet 3

INVENTOR.
NILS J. OMAN
BY H. S. Grover
ATTORNEY

Patented Mar. 7, 1950 2,500,090

UNITED STATES PATENT OFFICE 2,500,090

RADIO RELAYING

Nils J. Oman, Merchantville, N. J., assignor to Radio Corporation of America, a corporation of Delaware Application February 14, 1945, Serial No. 577,905

5 Claims. (Cl. 250—15)

This invention relates to radio signalling and has, for one object, the provision of an improved system for locally broadcasting a signal or program and simultaneously relaying the same to a distant point.

A further object of the invention is to provide an improved signalling system making use of a broadcast transmitter and a satellite station which will relay any given program to a distant repeating or broadcasting point without requiring synchronizing equipment.

In one form of the present invention the carrier frequency generating and modulating equipment of a broadcast FM transmitter, for example, is located near the studio in which the program, to be simultaneously broadcast and relayed, originates. Part of the generated frequency modulated waves are locally broadcast. Another portion of the modulated waves is divided down in frequency and utilized to frequency modulate the output of an ultra short wave radio relay link transmitter. The output of this link transmitter may be directively radiated to a distant point for further directive relaying or transmission, or for rebroadcasting. At a rebroadcasting point the received ultra short waves are demodulated so as to reproduce the frequency divided, frequency modulated waves and the latter are suitably altered as to deviation and frequency so as to be suitable for rebroadcasting purposes.

Other objects, advantages and features of the present invention will be self-evident as the more detailed description thereof proceeds.

In the accompanying drawings—

Fig. 1 is a schematic block diagram of instrumentalities wherein a single program may be locally broadcast and simultaneously relayed to a distant repeating point or, if desired, distant rebroadcasting point. In connection with Fig. 1, frequency dividers are employed for deriving a wave from the local broadcast transmitter which may be used to frequency modulate an ultra short wave suitable for directive relaying to some distant point and also, if desired, to automatically frequency control the oscillator of the local broadcast transmitter.

Figure 1:
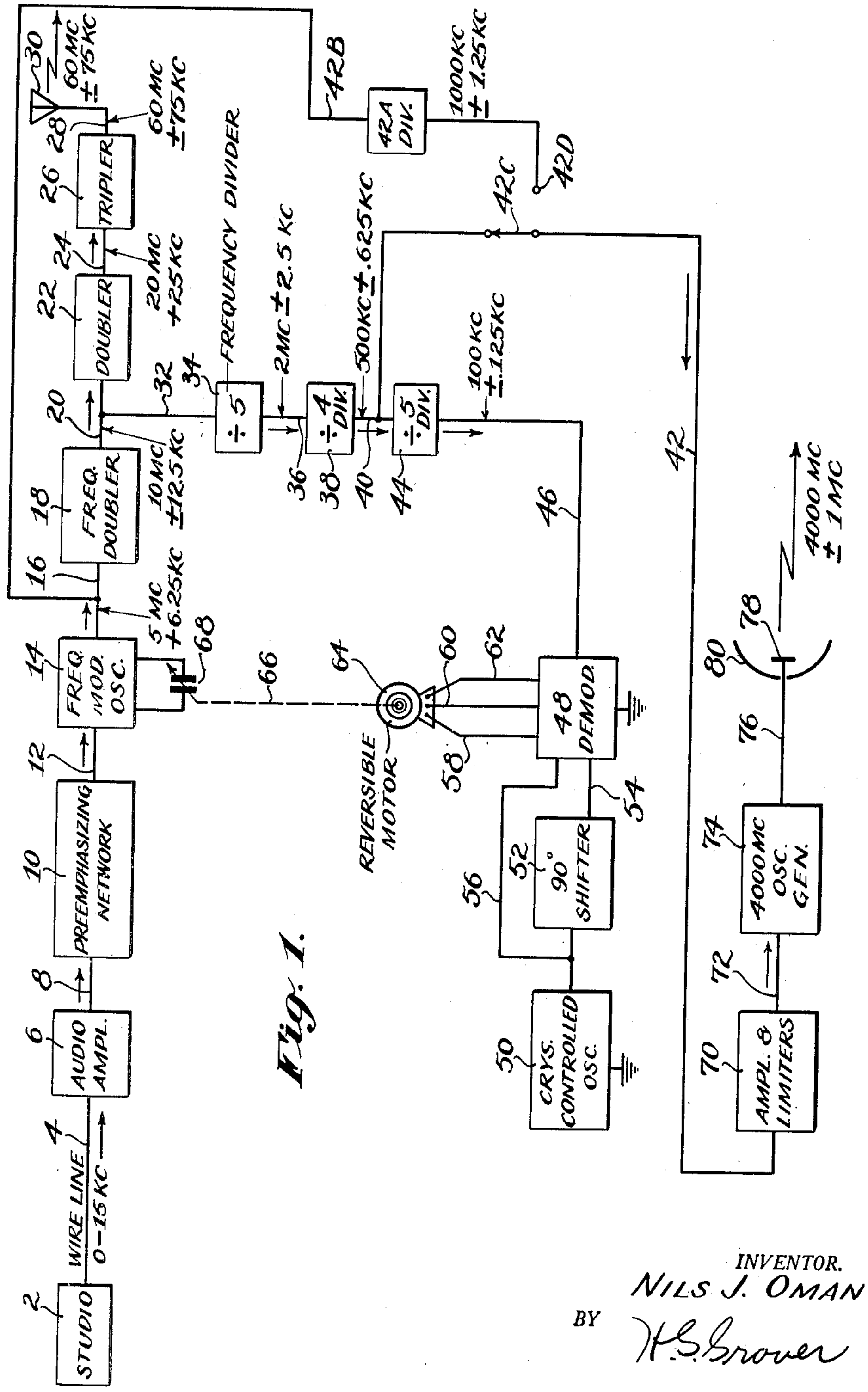

Referring to Figure 1, there is illustrated an arrangement wherein an audio program may be broadcast locally on the usual FM broadcasting frequencies and simultaneously relayed to a distant point for further relaying or rebroadcasting. An audio frequency program originating in studio 2 is picked up by one more microphones (not shown) and fed over a wire line 4 to an audio amplifier 6. Wire line 4 may be a high quality transmission line capable of transmitting a band of frequencies running from zero to 15 kilocycles without selective discrimination or attenuation.

The output of the amplifier 6 is fed through connections 8 to a pre-emphasizing network 10. This preemphasizing network should be designed so as to pre-emphasize the higher frequencies of the audio band fed to it in accordance with the impedance-frequency characteristics of a series inductance-resistance network having a time constant of 100 microseconds. The actual characteristic of such a pre-distorting network is illustrated at page 299 of an article appearing in the Bell System Technical Journal for April 1934 written by Messrs. H. A. Affel, R. W. Chestnut and R. H. Mills.

The output of the pre-emphasizing network may be further amplified, if desired, and whether or not amplified is fed through line or connection 12 to a frequency modulated oscillator 14. The output of the frequency modulated oscillator 14 is fed to a frequency doubler 18 feeding its output through line 20 to a further doubler 22. The latter, in turn, feeds its output through a transmission line 24 to a frequency tripler 26, the output of which is fed through transmission line 28 to the radiating antenna 30. Typical frequencies and frequency deviations appearing in various parts of the transmitter are indicated on the drawing, but, it is to be clearly understood, these values are merely illustrative.

For example, oscillator 14 may be operated at any frequency in a range of frequencies such as 2.5 to 5 megacycles, in which event the radiated unmodulated carrier from antenna 30 may lie in the band from 30 to 60 megacycles. Or if desired, frequencies and multiplying factors may be chosen so that the modulated carrier radiated over antenna 30 lies in the band of, for example, 84 to 102 megacycles. As indicated, oscillator 14 may be designed to have an unmodulated frequency of 5 megacycles and the audio input fed over line 12 may be adjusted so that the maximum deviation produced by the most intense or loudest audio signals fed to the oscillator is plus and minus 6.25 kilocycles. For the example chosen, the output of doubler 18 will be 10 megacycles with a maximum frequency swing of plus and minus 12.5 kilocycles; the output of doubler 22 will be 20 megacycles plus and minus 25 kilocycles and the output of tripler 26 will be 60 megacycles with a maximum swing of plus and minus 75 kilocycles.

For automatically frequency controlling the frequency modulated oscillator 14 so that the unmodulated radiated carrier radiated from antenna 30 remains on its assigned frequency, a reversible motor 64 is provided. This motor through mechanical linkage 66 operates tuning condenser 68 in such a way as to maintain the unmodulated carrier frequency at the desired value. Motor 64 is operated by beats derived from modulator 48, it being noted that modulator 48 is supplied with constant frequency waves over lines 54 and 56 displaced 90 degrees in phase by phase shifter 52. The source of the constant frequency waves so fed into the modulator 48 is a crystal controlled oscillator 50.

The remaining portion of the automatic frequency controlling system includes dividers 34, 38 and 44, divider 34 having a frequency dividing factor of 5, for example, and being supplied from the output of frequency doubler 18 through line 32. It is preferred that divider 34 be fed from the output of frequency doubler 18 rather than directly from the output of frequency modulated oscillator 14 in order to prevent reaction of the frequency controlling system upon the frequency modulated oscillator.

The output of divider 34 has a frequency of 2 megacycles with a maximum deviation of plus and minus 2.5 kilocycles and this wave is fed to divider 38 having a frequency dividing factor of 4, for example. The output of frequency divider 38 is fed to divided 44 which may have a frequency dividing factor of 5, as indicated. The output of frequency divider 44 will be a wave of 100 kilocycles having a maximum deviation of plus and minus .125 kilocycles. This wave is fed through line 46 to the modulator 48.

The foregoing automatic frequency controlling system and the modulating system, it will be recognized, is essentially similar to the system described by J. F. Morrison in his U. S. Patent 2,250,104, dated July 22, 1941, with the exception already noted, namely, that the first frequency divider for the automatic frequency controlling system is connected to the output of doubler 18 rather than directly to the output of the frequency modulated oscillator 14.

The frequency modulated oscillator 14 may be of the type described in the Morrison patent or, if desired, may be any one of the types described by Murray G. Crosby in an article entitled "Reactance tube frequency modulators" appearing in the RCA Review for July 1940 at page 89. The various dividers may be of the type described in the Morrison patent or, preferably, of the type described and claimed by G. W. Beers in U. S. Patent 2,356,201. The frequency multipliers 18, 22 and 26 may be of the type described by C. W. Hansell in U. S. Patent 1,878,308.

As before indicated the waves radiated from antenna 30 are for local broadcast purposes. In order to transmit the program originating in studio 2 to some distant broadcasting station for broadcast purposes, it has been proposed to send the same to the distant station by way of wire lines. However, in accordance with the present invention the use of expensive wire lines for this purpose is avoided in the following way:

A portion of the output of one of the frequency dividers, such as 38 in Figure 1, is fed through connection 42 to a group of amplifying and limiting tubes 70. The output of the amplifier and limiter 70 is fed through connection 72 to an ultra high frequency oscillation generator 74 for the purpose of frequency modulating the same. Oscillator 74, as indicated, may have an unmodulated frequency of 4000 megacycles. The frequency modulated output of oscillator 74 is fed through transmission line 76 and directively radiated from a dipole antenna 78 and beamed by the action of parabolic reflector 80. The amplitude of the waves fed through line 72 to the ultra high frequency oscillator 74 may be adjusted such that the output radiated over antenna 78 may be 4000 megacycles modulated plus and minus one megacycle.

Oscillator 74 and the circuits for frequency modulating the same may be similar to the arrangement shown in L. E. Thompson application Serial No. 576,453 filed February 6, 1945. More specifically, the amplifiers and limiters 70 of Figure 1 may be of the type shown in Figure 8A of the Thompson application; the frequency modulated oscillator 74 may be of the type shown in Figure 6 of the Thompson application, and the radiating system 78, 80 may be of the type shown in Figure 10 of the Thompson application.

If desired, as illustrated in Figure 1, the input to amplifier 70 may be derived from a separate frequency divider 42A. The input of the divider 42A may be connected directly to the output of frequency modulated oscillator 14 through transmission line 42B. The output of divider 42A may be connected to the amplifier 70 by throwing switch 42C to its other position 42D. The dividing factor of 42A may be 5 in which case the input to 74 over line 72 will be 1000 kc.±1.25 kc. as shown, for maximum frequency modulation of 14.

Figure 2:
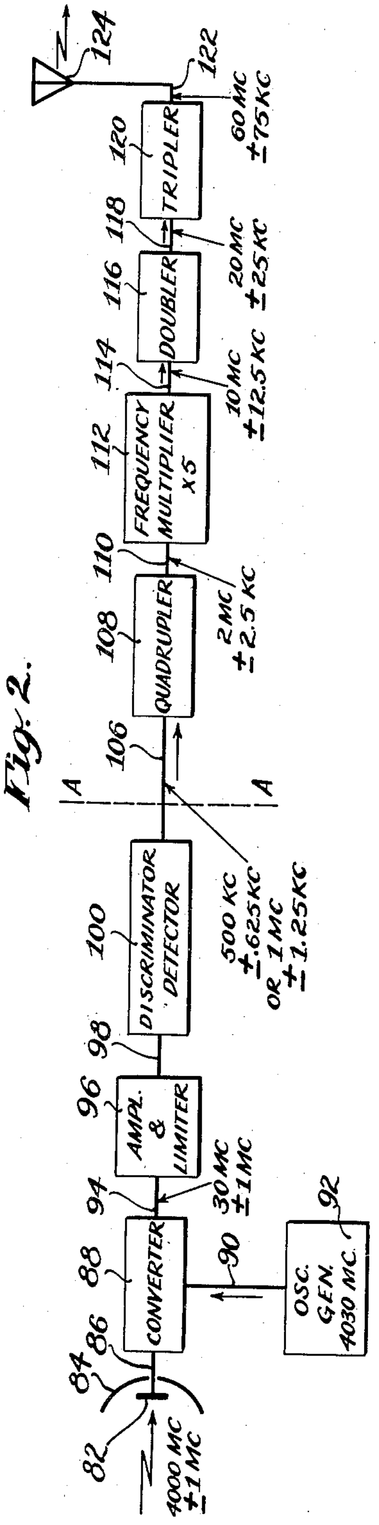
Fig. 2 is a block diagram of an ultra short wave receiving station for receiving the ultra short wave directively transmitted by the relaying apparatus of Fig. 1 and for converting the received wave into a form suitable for rebroadcasting purposes.

In Figure 2 the waves received from the ultra short wave relaying antenna 78 are received and converted at the distant receiving point to a suitable frequency for rebroadcasting in an assigned broadcast band, for example, from 30 to 60 megacycles. The arrangement, it will be observed, offers distinct advantages since operations take place at high frequencies and it is not necessary at any point in the system to reproduce the original modulating frequency band of from zero to 15 kilocycles. In this way distortion is minimized and high fidelity in rebroadcasting maintained.

More specifically in connection with Figure 2, the waves transmitted from antenna 78 of Figure 1 are received upon the dipole parabolic reflector antenna arrangement 82, 84 of Figure 2. The received waves are fed to a converter 88 also fed through line 90 with locally generated oscillations having a frequency of, for example, 4030 megacycles. The oscillator 92 and converter 88 may be of the type described by L. E. Thompson in Figure 7 of his application Serial No. 576,453 filed February 6, 1945.

The output of converter 88 is the beat difference between the received and locally generated waves and, hence, is a wave of 30 megacycles having a deviation of plus and minus one megacycle in accordance with illustrative frequency values chosen. This beat is fed through connection 94 to the amplifier and limiter 96 feeding through line 98 a discriminator-detector arrangement 100. This discriminator-detector arrangement may be of the type described in the above-mentioned Thompson application in Figure 9 at 930, 934, 938, 948, 932 and 950. Or, it may be of the type described in the patent to Mountjoy #2,280,530 or of the type described in Seeley Patent #2,121,103.

The output of the discriminator-detector will appear in line 106 and will be a wave having a mean frequency of 500 kilocycles and a maximum deviation of plus and minus 0.625 kilocycle corresponding to the output of divider 38 of Figure 1. Or if divider 42A of Fig. 1 is used, the output of 100 will be 1 megacycle ±1.25 kilocycles. This wave output of 100 is successively frequency multiplied in frequency multipliers 108, 112, 116 and 120 having multiplying factors of, respectively, 4, 5, 2 and 3. The multipliers are connected together by lines 110, 114 and 118, as indicated, and carry waves having mean frequencies and deviations as indicated on the drawing. It will be found that the output of tripler 120 will be a 60 megacycle wave having a maximum deviation of plus and minus 75 kilocycles which may be broadcast over an antenna 124 connected to the tripler 120 by way of transmission line 122.

In the arrangement shown in Figure 2, rebroadcasting at the distant broadcasting station of Figure 2 is illustrated to be at the same frequency as the broadcasting frequency employed at the terminal broadcasting station of Figure 1. Obviously the distant broadcasting station of Figure 2 may broadcast at some different carrier frequency if desired. This may be accomplished by choosing appropriate frequency multiplying factors or by heterodyning the waves to any desired frequency for retransmittal.

Figure 3:
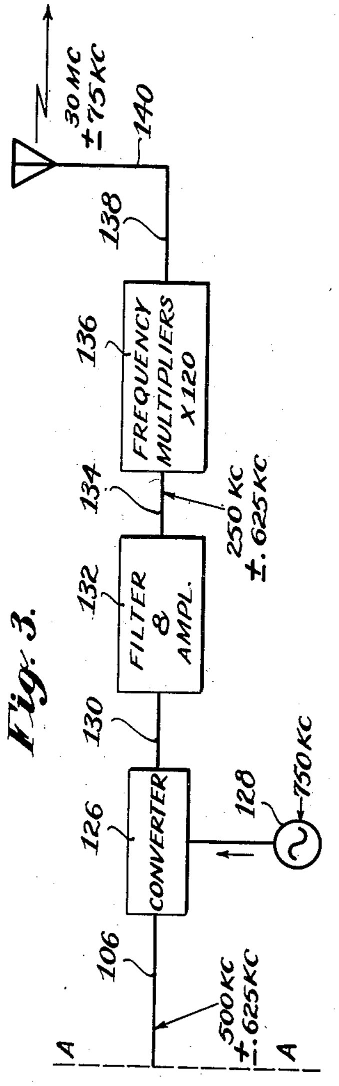
Figs. 3 and 4 are partial block diagrams illustrating modified forms of certain apparatus which may be used in connection with the relaying system of Fig. 2.

One such arrangement is illustrated in Figure 3. The apparatus of Figure 3 is used to replace the apparatus of Figure 2 to the right of line A, A. Thus, in Figure 3 the wave appearing in line 106 having a mid-frequency of 500 kilocycles and a maximum frequency deviation of plus and minus .625 kilocycle is fed to a frequency converter 126 also supplied with oscillations from a local oscillation generator 128 here shown to have a frequency of 750 kilocycles. The output of converter 126 is fed to a filter and amplifier 132 which passes one side band, for example, 250 kilocycles plus and minus .625 kilocycle, resulting from the beating of the wave generated at 128 and the wave fed into the converter 126 at 106. The output of the filter and amplifier 132 may be fed through line 134 to a chain of frequency multipliers having a total frequency multiplying factor of, for example, 120. The resulting wave will then have a mid-frequency of 30 megacycles and a total maximum swing of plus and minus 75 kilocycles and this wave may be fed through transmission line 138 to the broadcasting antenna 140. By increasing the frequency of oscillator 128 and by properly adjusting the band pass of filter 132 any modulating carrier frequency lying within the range of 30 to 60 megacycles, for example, may be radiated over antenna 140.

Figure 4:
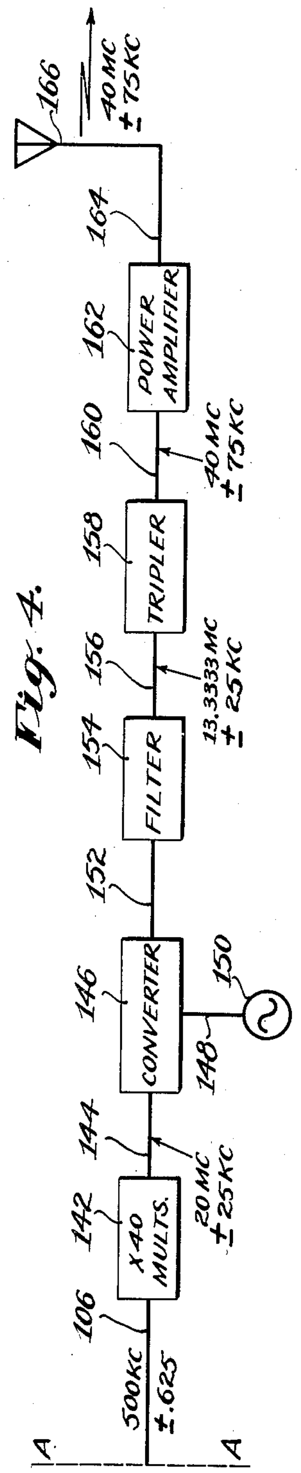

Figure 4 shows still another arrangement for apparatus which may be substituted to the right of line A, A of Figure 2 in order to adjust the mid-broadcast frequency of the waves radiated over the broadcasting antenna 166 of Figure 4. As shown in Figure 4, waves fed in over line 106 are frequency multiplied by frequency multiplier 142 having a frequency multiplying factor of 40, for example. The multiplied wave appearing in line 144 is fed to converter 146, supplied through connection 148 with constant frequency waves from oscillation generator 150 having a frequency of 33.3333 megacycles. The output of converter 146 is fed through line 152 and filter 154.

As shown, filter 154 is designed to pass a mid-frequency of 13.3333 megacycles plus and minus 25 kilocycles. The waves passed by filter 154 are fed through line 156 to a tripler 158 whose output is a wave of 40 megacycles with a deviation of plus and minus 75 kilocycles. The latter wave may be fed through line 160, power amplifier 162, transmission line 164 to the broadcasting radiating antenna 166.

Figure 5:
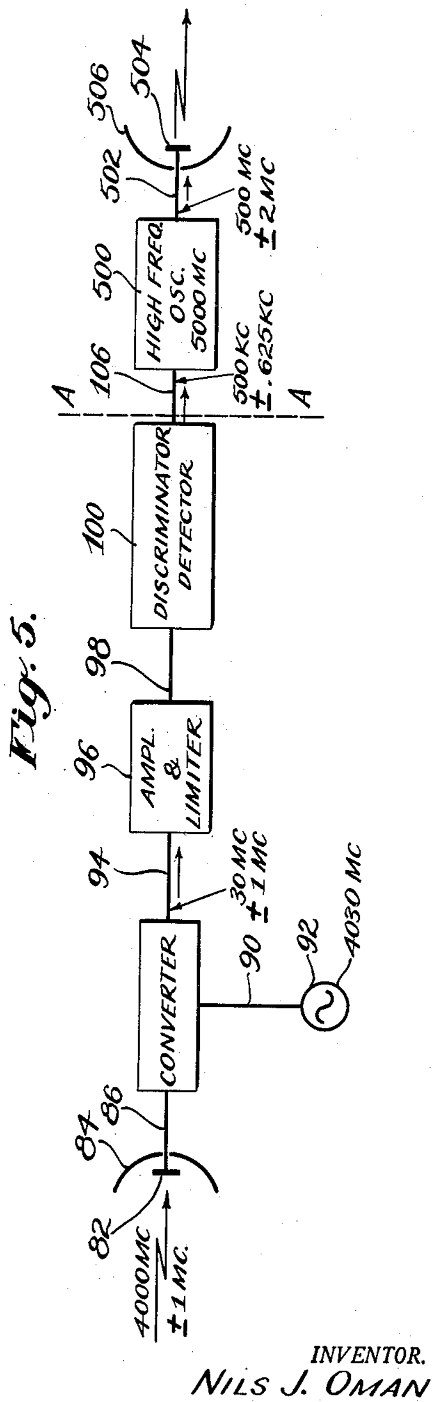
Fig. 5 illustrates schematically in block diagram form, an ultra short wave relaying station of which one or more may be interposed between the local system such as shown in Fig. 1 and a terminal rebroadcasting station such as shown in Fig. 2.

Although, as described above, the waves radiated from antenna 78 of Figure 1 may be relayed directly to the receiving system of Figure 2, such waves may be relayed to the arrangement of Figure 2 through one or more relay stations such as illustrated in Figure 5. It will be observed in Figure 5 that the apparatus to the left of line A, A is identical to the apparatus to the left of line A, A of Figure 2. However, the frequency modulated wave appearing in line 106 having a mean frequency of 500 kilocycles and a deviation of plus and minus .625 kilocycle is fed to a high frequency oscillator such as 500 which may be adjusted to have an unmodulated frequency of 5000 megacycles. When modulated, the output of ultra high frequency oscillator 500 may be deviated plus and minus 2 megacycles and this frequency modulated wave may be fed through transmission line 502 to the antenna 504 for directive radiation by the action of parabolic reflector 506 to a following relaying station identical to the arrangement shown in Figure 5 but suitably adjusted for reception of the wave radiated at 504. Or, the wave radiated at 504 of Figure 5 may be picked up by the antenna arrangement 82, 84 of Figure 2 and acted upon by the remainder of the apparatus of Figure 2 suitably adjusted for the frequency radiated by antenna 504 of Figure 5.

Having thus described my invention, what I claim is:

1. A system for simultaneously broadcasting and relaying a program comprising means for generating high frequency waves, means for frequency modulating the generated high frequency waves with a signal, means for utilizing a portion of the modulated waves for local broadcasting, means for frequency dividing another portion of the modulated waves, means for utilizing one portion of the divided waves to automatically frequency control said high frequency generator, means for generating ultra short waves, and means for utilizing another portion of said frequency divided waves for frequency modulating the waves generated by said ultra short wave generator.

2. In combination, a generator of high frequency waves, a source of signaling waves, instrumentalities for frequency modulating the waves generated by said high frequency generator, instrumentalities for frequency dividing a portion of the modulated output of said generator, apparatus utilizing said divided waves for automatically frequency controlling said generator, a circuit for utilizing another portion of the frequency modulated output of said generator for local broadcast purposes, a second frequency divider for frequency dividing still another portion of the output of said frequency modulated generator, an ultra high frequency generator, and instrumentalities for utilizing the output of said second divider for frequency modulating the output of said ultra high frequency generator.

3. The method which includes generating a high frequency wave, frequency modulating the generated high frequency wave in accordance with a signal, utilizing a portion of the frequency modulated wave for local broadcast purposes, frequency dividing a portion of the frequency modulated wave, utilizing the frequency divided wave for frequency controlling the mean frequency of the frequency modulated waves, separately frequency dividing another portion of the frequency modulated waves, generating ultra short waves, and utilizing the separately divided waves for frequency modulating the generated ultra short waves.

4. The method of simultaneously broadcasting and relaying a program which includes generating high frequency waves, frequency modulating the generated high frequency waves with a signal, locally broadcasting a portion of the modulated waves, frequency dividing another portion of the frequency modulated waves, frequency controlling the generated high frequency waves with one portion of the divided waves, generating ultra short waves, and frequency modulating the generated ultra short waves with another portion of said divided waves.

5. In combination, a generator of high frequency waves, a source of signaling waves, instrumentalities for frequency modulating the waves generated by said high frequency generator, instrumentalities for frequency dividing a portion of the modulated output of said generator, apparatus utilizing said divided waves for automatically frequency controlling said generator, a circuit for utilizing another portion of the frequency modulated output of said generator for local broadcast purposes, a second frequency divider for frequency dividing still another portion of the output of said frequency modulated generator, an ultra high frequency generator, instrumentalities for utilizing the output of said second divider for frequency modulating the output of said ultra high frequency generator and means for directively radiating the output of said ultra high frequency generator.

NILS J. OMAN.

REFERENCES CITED

The following references are of record in the file of this patent:

UNITED STATES PATENTS

| Number | Name | Date |
|---|---|---|
| 1,568,938 | Clement | Jan. 5, 1926 |
| 1,799,976 | Falknor | Apr. 7, 1931 |
| 1,861,462 | Trouant | June 7, 1932 |
| 2,028,880 | Runge et al. | Jan. 28, 1936 |
| 2,155,821 | Goldsmith | Apr. 25, 1939 |
| 2,233,183 | Roder | Feb. 25, 1941 |
| 2,284,415 | Goldstine | May 26, 1942 |
| 2,298,409 | Peterson | Oct. 13, 1942 |
| 2,304,969 | Trevor | Dec. 15, 1942 |
| 2,406,932 | Tunick | Sept. 3, 1946 |
| 2,407,213 | Tunick | Sept. 3, 1946 |
| 2,458,124 | Wilmotte | Jan. 4, 1949 |